United States Patent [19]

Sherlock

[11] E Re. 30,393

[45] Reissued Sep. 2, 1980

[54] PLASTIC PIPE CONSTRUCTION

[75] Inventor: Charles J. Sherlock, New Brighton, Minn.

[73] Assignee: Western Packing and Supply Company, Addison, Ill.

[21] Appl. No.: 23,945

[22] Filed: Mar. 26, 1979

Related U.S. Patent Documents

Reissue of:

[64] Patent No.: 3,367,370
Issued: Feb. 6, 1968
Appl. No.: 526,225
Filed: Feb. 9, 1966

[51] Int. Cl.[3] ..... F16L 55/00; F16L 11/12

[52] U.S. Cl. ..... 174/37; 138/104; 138/105; 138/133; 324/67; 174/47

[58] Field of Search ..... 138/103, 104, 105, 133, 138/138, 177, 178, 153, 122, 132, 134; 174/44, 47, 98; 52/105; 285/93; 137/551; 405/157; 324/67

[56] References Cited

U.S. PATENT DOCUMENTS

| | | | |
|---|---|---|---|
| 837,512 | 12/1906 | Seeley | 138/138 X |
| 1,478,038 | 12/1923 | Whitmarsh | 138/138 X |
| 2,140,638 | 12/1938 | Maclachlan | 138/133 |
| 2,167,490 | 7/1939 | Ryan . | |
| 2,192,765 | 3/1940 | Blake . | |
| 2,200,967 | 5/1940 | Phillips | 138/138 X |
| 2,627,378 | 2/1953 | Hirsh . | |
| 2,722,237 | 11/1955 | Rosel | 138/174 |
| 2,745,074 | 5/1956 | Darling . | |
| 2,854,840 | 10/1958 | Anderson | 52/105 |
| 3,115,861 | 12/1963 | Allen . | |
| 3,169,552 | 2/1965 | Fawick | 138/133 |
| 3,189,676 | 6/1965 | Muller . | |
| 3,219,501 | 11/1965 | Volk . | |
| 3,275,038 | 9/1966 | Roberts et al. | 138/138 X |

FOREIGN PATENT DOCUMENTS

| | | |
|---|---|---|
| 3181 | of 1914 | United Kingdom . |
| 327093 | 3/1930 | United Kingdom . |

OTHER PUBLICATIONS

"Metal Locators" by Blankmeyer, W. H., Electronics Magazine, Dec. 1943, pp. 112–115, 236, 238, 240.

"Locating Non-Metallic Pipe" by MacLeod, George M., Gas Magazine, Nov. 1959, p. 73.

"Plastics Pipe Helps Gila Bend Get Gas" by Jorgensen, Earl M., Gas Magazine, Mar. 1960, pp. 82–86.

"Designing Distribution Systems From Scratch With Plastics" by Richards, J. S., Gas Magazine, May 1965, pp. 86–92.

"Portal-to-Portal" by Stoll, L., Gas Magazine, May 1964, pp. 2, 4, 76–81, 92–94.

"Activity Report of AGA Subcommittee on Plastics Pipe Standards" by Webster, I. S., Gas Magazine, Mar. 1965, p. 86.

"Gas Industry Predicts It Will Use Over 1000 Miles of Plastics Pipe During '62" by Clay, Robert, Mar. 1962, Gas Magazine, pp. 2, 4, 78–81, 103.

"PVC Plastics Mains" by Berguson, Howard E., Gas Magazine, Mar. 1965, pp. 74–78.

"Plastic Main 'Planted' Off Reel", American Gas Journal, Jan. 1965, pp. 38–41.

"Plastics Pipe Installation", Gas Magazine, Mar. 1962, pp. 85–91.

"Locating Underground Pipes" by Eggleston, H., Instruments Magazine, Jan. 1951, pp. 105–108, 110.

"Experiences with Plastics Pipe" by Sanders, James L., Gas Magazine, Sep. 1960, pp. 61–63.

"Aerial Gas Distribution Network" by Sherlock, C. J., Pipe Line Industry Magazine, Jul. 1964, pp. 44–46.

"11. Pipe Identification", Gas Magazine, Sep. 1959, p. 65.

"It's Called Tripl-Dek", Eaton Corporation Tripl-Dex Product Brochure.

"Four All-Plastic Distribution Systems . . . 'Twins'", American Gas Journal, May 1965, pp. 59–61.

"Plastic Industry Report to the Gas Industry" by Look, Edward H., AGA Paper 1964.

*Primary Examiner*—James E. Bryant, III
*Attorney, Agent, or Firm*—McDougall, Hersh & Scott

[57] ABSTRACT

A transmission system for handling materials moving underground comprising a plastic pipe having metallic material of relatively high electrical or electronic conductivity and sensitivity secured to the pipe body. When the pipe is installed in the ground, the metallic material will be automatically buried in association with the pipe body. Detecting means suitable for sensing the presence of the conductive material can then be employed for locating the pipe whereby digging operations or other activities can be engaged in without the danger of damaging the pipe.

1 Claim, 8 Drawing Figures

FIG. 1
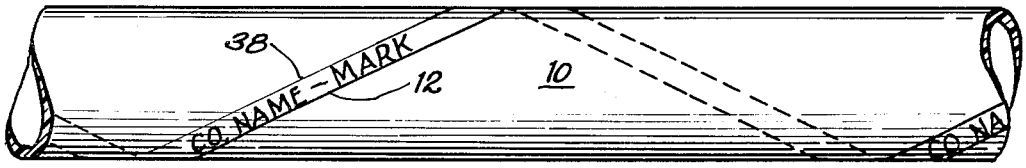
FIG. 2 FIG. 3 FIG. 4 FIG. 5
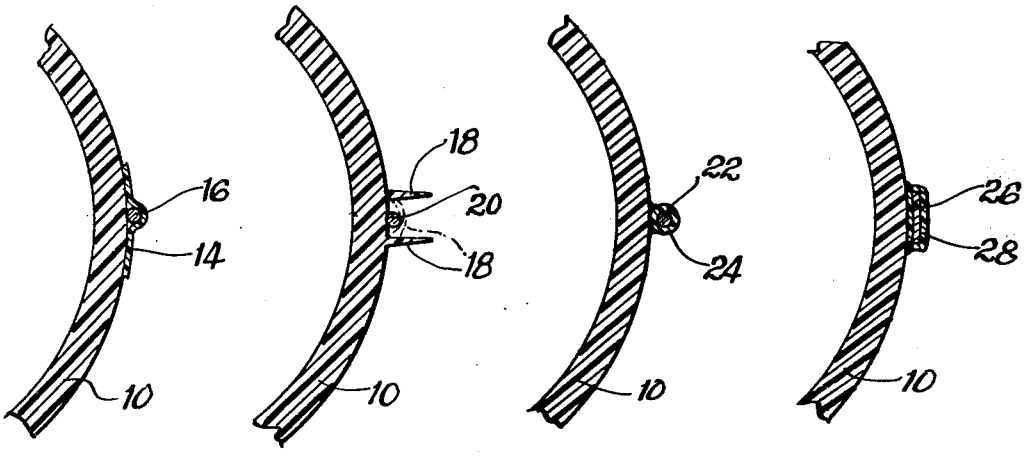
FIG. 6
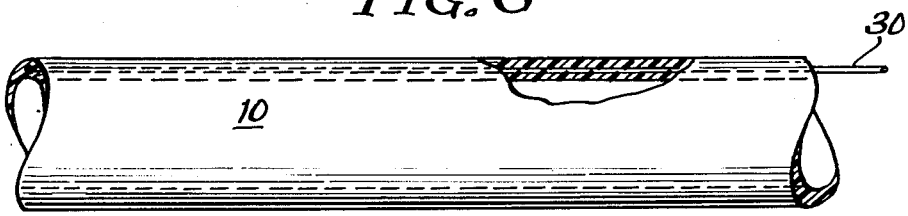
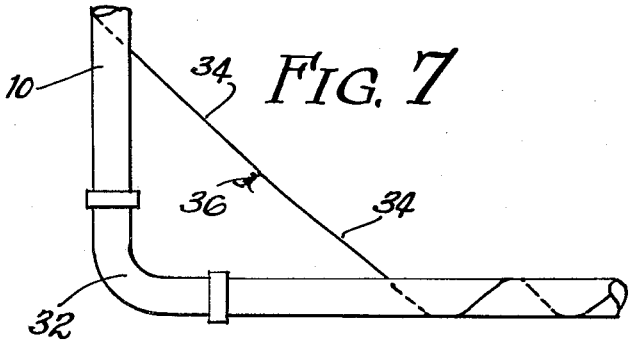
FIG. 7

PLASTIC PIPE CONSTRUCTION

Matter enclosed in heavy brackets [ ] appears in the original patent but forms no part of this reissue specification; matter printed in italics indicates the additions made by reissue.

This invention relates to an improved plastic pipe construction. In particular, the invention concerns plastic pipe of a type which is inserted in the ground or otherwise embedded whereby materials can be transmitted through the pipe. The invention will be described with reference to the use of the pipe for the transmission of natural gas; however, it will be obvious that other applications of the novel constructions are available, such as water, oil or sewer distribution or collection systems.

In the use of plastic pipe by gas companies, the pipe is usually located beneath the surface of the earth. Main lines may be provided for transmitting gas from its source and various branch lines are then provided as connections to the main line. The main line and branches connected thereto may be relatively large. On the other hand, pipe lines to homes may be relatively small. The instant invention is intended for application to all varieties of such constructions.

Considerable practical difficulties arise when attempts are made to locate pipes of the type described. Thus, when a breakdown occurs, or when it is necessary to connect additional branch lines or perform other work, the exact location of the pipes must be determined. Since the pipes are under ground, it is obvious that this cannot be accomplished by simple techniques. For example, a mere digging operation to locate the pipes can be a strictly hit and miss proposition.

Plastic pipes present particular problems in this regard. Thus, metal pipes can be more readily located since metal detectors are available and the earth or other materials will not adversely affect the operation of such detectors. Plastic pipe is not, however, susceptible to detection by such means.

It is a general object of this invention to provide a plastic pipe construction which is ideally suited for use in applications which require embedding of the pipe in the soil or in other materials.

It is a more particular object of this invention to provide a plastic pipe construction which can be readily located when embedded in the soil or in other material, and to provide a pipe marking capability that is of a permanent nature but which does not damage or reduce the pipe or tubing wall.

These and other objects of this invention will appear hereinafter and for purposes of illustration, but not of limitation, specific embodiments of this invention are shown in the accompanying drawings in which:

FIG. 1 is a side elevation of a section of pipe characterized by the features of this invention;

FIGS. 2 through 5 comprise enlarged fragmentary sectional views illustrating various forms of the invention;

FIG. 6 is a side elevation of a section of pipe characterized by a modified form of the invention; and, FIG. 7 is an elevational view illustrating the manner in which coupling of pipe sections can be accomplished in accordance with the practice of this invention.

Figure 8:
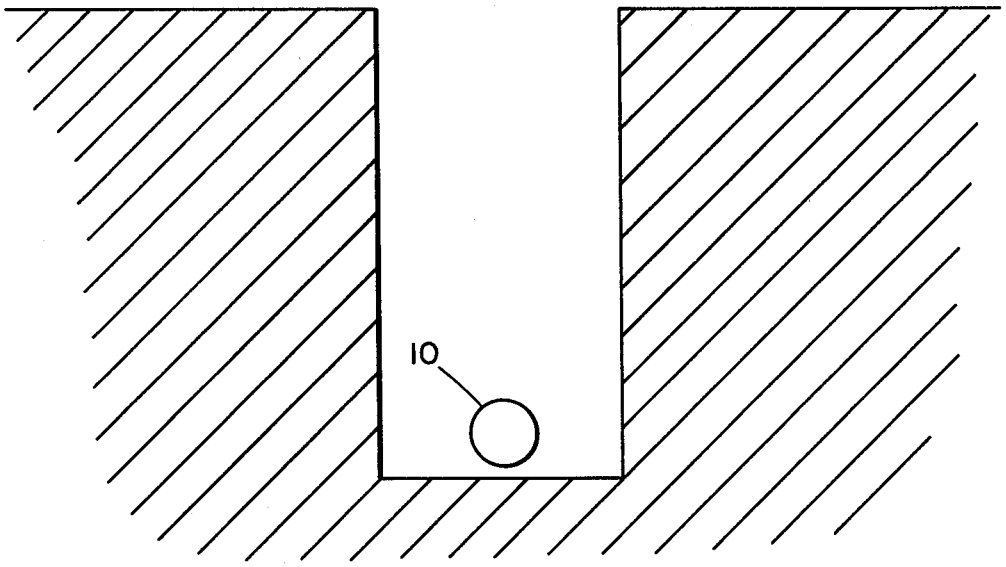
*FIG. 8 illustrates a pipe construction according to the invention positioned underground.*

The plastic pipe construction of this invention comprises a length of conventional plastic pipe which is modified whereby the pipe will be subject to detection when located in the ground. The pipe is provided with a strip of metal which is directly associated with the pipe, preferably during the manufacture of the pipe.

When the pipe is modified in accordance with this invention, the pipe is susceptible to detection by various means. Metal detectors such as magnetically sensitive instruments can be utilized. The construction of this invention is also uniquely suitable for use in conjunction with electrical equipment. As will be noted, the metal which is associated with the pipe can be arranged whereby connections can be made over long distances thereby providing a highly suitable means for achieving location of the pipe.

FIG. 1 illustrates a section 10 of plastic pipe. A strip 12 is wound around the pipe in spiral fashion. As indicated, the pipe can be of any size, and the pitch of the strip with respect to the pipe axis will vary with the pipe size in order to produce a desired amount of slack in the strip with respect to the length of the pipe. It has been found that approximately three inches of wire slack per foot of pipe provides a desirable arrangement when the pipe is employed in a manner to be described hereinafter. It will also be explained, however, that the spiral arrangement is not necessary in all cases.

FIGS. 2 through 5 illustrate the manner in which the metal can be associated with the pipe 10. In FIG. 2, a strip 14 of plastic is solvent welded or fused over the metal wire 16 in place. A strip of adhesive tape could also be utilized. The strip of course can be printed before or after attachment to the pipe.

The arrangement shown in FIG. 3 involves the use of a pair of ridges 18 which are extruded with the pipe. A wire 20 is then located in the channel between the ridges, and the ridges are then bent over and sealed, for example by heat sealing, whereby the wire will be retained in position. The ridges can then be printed as desired.

The arrangement shown in FIG. 4 provides for the use of a wire 22 which is coated with plastic 24. This arrangement is then attached to the pipe 10 by fusing the two plastics together or by the use of a suitable adhesive. The plastic coated wire may be printed as desired.

FIG. 5 illustrates an arrangement similar to that shown in FIG. 4. In this modification, a strip of metal 26 is coated with plastic 28, and the combination secured to the pipe 10. It will be appreciated that in all cases, the use of a flat strip comprises an alternative to the use of a wire. The strip of metal may be printed as necessary or the plastic covering of the strip may be printed.

A further modification of the invention is shown in FIG. 6. In this instance, a wire 30 is embedded in the wall of the pipe during extruding of the pipe. It will be noted that the strip 30 runs linearly along the length of the pipe, and it will be appreciated that each of the modifications described above can be associated with the pipe in either this fashion or in a spiral fashion. Similarly, the wire 30, a metal strip, or similar arrangement could be embedded in the pipe in a spiral fashion.

In the use of the construction of this invention, the pipe can be inserted in the ground or otherwise embedded in a conventional fashion. Thus, the presence of the metal in association with the pipe will not interfere with the installation. This greatly simplifies the use of plastic pipe since location of the pipe can be readily accomplished because of the presence of the metal while no significant difficulties are presented with respect to installation of the pipe. It will also be appreciated that this invention greatly simplifies inventory and installation problems since there is no need to maintain a supply of metal which could be laid down adjacent the pipe during its installation.

Where it is desirable to interconnect sections of the pipe, as where an electrical circuit is utilized for detection purposes, the use of a spiral pattern in associating the wire with the pipe is preferred. Thus, there will always be slack available whereby the wire can be pulled away from the coupled ends of the pipe and then attached to the wire of an adjoining pipe. FIG. 7 illustrates an arrangement of this type wherein two pipe sections 10 are interconnected by means of an elbow 32. The wire 34 associated with the respective pipe sections is pulled away from the respective ends of the pipe sections whereby slack will be available for securing the wire at 36.

The construction of this invention also provides distinct advantages with respect to manufacturing of the pipe. The wire or strip can be associated with the pipe during an extruding operation; thus, conventional techniques can be employed for connecting a source of wire in association with an extrusion die whereby the wire will be embedded in the pipe as it passes out of the die. With respect to other embodiments of the invention, it will be obvious that the wire can be laid on the pipe surface or wrapped around the pipe as the pipe is moving away from an extrusion die.

As indicated in FIG. 1, marking 38 can readily be associated with the material utilized for securing the metal onto the pipe. Where adhesive or plastic strip is employed, the strip can have the desired marking printed on its surface prior to its association with the pipe. Indent type of printing may be employed in all of the designs anticipated herein. Such markings are often required by official specifications, and the instant invention greatly simplifies techniques for providing the markings.

In referring to the use of plastic pipe, it will be understood that this is intended to be interpreted in a broad sense. Non-metallic pipes commonly used as conduits, and particularly light, relatively inexpensive and durable pipes which are extruded in their manufacture are contemplated. The metals associated with the pipes may comprise copper which is readily detectable with certain conventional detecting systems. Other metals including magnetic materials are, of course, contemplated. It will also be understood that more than one wire can be associated with pipe where such an arrangement proves desirable.

It will be understood that various changes and modifications may be made in the above described construction which provide the characteristics of this invention without departing from the spirit thereof particularly as defined in the following claims.

That which is claimed is:

1. In a construction comprising a transmission system for the movement of materials under ground including plastic pipe having a resinous plastic body for carrying said materials, said pipe being buried in the ground whereby the location of the pipe cannot be determined by visual inspection, the improvement comprising metallic material of relatively high electrical conductivity secured to the pipe body, said electrically conductive material being secured along substantially the entire length of said body whereby the electrically conductive material will be automatically buried in association with the pipe body as the pipe is placed in the ground, and whereby detecting means suitable for sensing the presence of the electrically conductive material can be employed for locating the pipe from above ground.

[2. A construction according to claim 1 wherein said system is a natural gas transmission system having a plurality of lengths of said pipe included therein, and wherein said electrically conductive material comprises a continuous length of metal extending along the entire length of each section of pipe, and wherein the adjacent ends of the metal of connected sections are joined together.]

[3. A construction according to claim 2, in which the length of said metal member exceeds the length of said pipe body by approximately three inches of excess length per foot of pipe.]

[4. A construction according to claim 1 wherein said electrically conductive material comprises a wire-like member extending in spiral fashion around said pipe body whereby excess material will be available for connecting the conductive material of adjacent sections of pipe.]

[5. A construction in accordance with claim 1 wherein said electrically conductive material is associated with the exterior of said pipe body and includes an exposed outer surface, and wherein printed material is applied to said exposed outer surface for purposes of identifying the pipe.]

[6. A construction according to claim 1, in which said electrically conductive material comprises a metal member secured on and extending along substantially the entire length of said pipe body, said metal member being attached to the outside of said pipe body by means of an adhesive strip.]

[7. A construction according to claim 1, in which said electrically conductive material comprises a metal member adhesively secured to and extending along substantially the entire length of said plastic pipe body.]

[8. A construction according to claim 1, in which said electrically conductive material comprises a metal member secured on and extending along substantially the entire length of said plastic pipe body, said metal member being attached to the outside of said plastic pipe body by a strip adhesively secured to said body, said strip having printing applied thereto for identification purposes.]

[9. A construction according to claim 1, in which said electrically conductive material comprises a metal wire secured on and extending along substantially the entire length of said plastic pipe body.]

* * * * *